US012705246B2

(12) United States Patent
Vetzler et al.

(10) Patent No.: US 12,705,246 B2
(45) Date of Patent: Aug. 11, 2026

(54) OPTIMIZING RETRIEVAL-AUGMENTED GENERATION SYSTEMS THROUGH ENHANCED DOCUMENT SELECTION

(71) Applicant: Intuit Inc., Mountain View, CA (US)

(72) Inventors: Matan Vetzler, Ramat Gan (IL); Oren Dar, Heidelberg (DE); Osnat Haj Yahia, Tayibe (IL); Raphaël Vannerom, Tel Aviv (IL)

(73) Assignee: Intuit Inc., Mountain View, CA (US)

( * ) Notice: Subject to any disclaimer, the term of this patent is extended or adjusted under 35 U.S.C. 154(b) by 63 days.

(21) Appl. No.: 18/679,441

(22) Filed: May 30, 2024

(65) Prior Publication Data

US 2025/0371016 A1 Dec. 4, 2025

(51) Int. Cl.

*G06F 16/2457* (2019.01)
*G06F 16/93* (2019.01)
*G06N 3/0895* (2023.01)

(52) U.S. Cl.

CPC ........ *G06F 16/24578* (2019.01); *G06F 16/93* (2019.01); *G06N 3/0895* (2023.01)

(58) Field of Classification Search

CPC ............. G06F 16/24578; G06F 16/248; G06F 16/332; G06F 16/334; G06F 16/335; G06F 16/35; G06F 16/355; G06F 16/90335; G06F 16/906; G06F 16/93; G06N 20/00; G06N 3/08; G06N 3/0895

See application file for complete search history.

(56) References Cited

U.S. PATENT DOCUMENTS 12,524,678 B2 * 1/2026 Bulut .................... G06N 3/0895
2016/0125013 A1 * 5/2016 Barborak ................ G06F 16/36 707/748
2024/0311563 A1 * 9/2024 Somech ................ G06F 40/295
2024/0330446 A1 * 10/2024 Bulut .................... G06N 3/0895
2024/0427779 A1 * 12/2024 Schafer ............. G06F 16/24578

(Continued)

OTHER PUBLICATIONS

Chao et al, Make Large Language Model a Better Ranker, Nov. 12-16, 2024, In Findings of the Association for Computational Linguistics: EMNLP 2024, pp. 918-929 (Year: 2024).*

(Continued)

*Primary Examiner* — Amy Ng
*Assistant Examiner* — Cheryl M Shechtman
(74) *Attorney, Agent, or Firm* — Lathrop GPM LLP

(57) ABSTRACT

A method includes applying a document ranking layer of a document selection large language model (LLM) to a document list including multiple reference documents to obtain a ranked document list. The method further includes selecting a subset of reference documents from the ranked document list and processing a user prompt and the document subset by a field LLM to generate an answer. The method further includes ranking the answer with an answer score by a ranking LLM. The method further includes ranking the document subset by the ranking LLM to obtain a ranked document subset. The method further includes calculating a loss function of a preference optimization layer of the document selection LLM based on the answer score and updating at least one training parameter of a foundation model of the document selection LLM based on the loss function of the preference optimization layer.

20 Claims, 5 Drawing Sheets

(56) References Cited

U.S. PATENT DOCUMENTS

2025/0004915 A1* 1/2025 Rudenko ............ G06F 11/3604
2025/0124066 A1* 4/2025 McElvain ............ G06F 16/335

OTHER PUBLICATIONS

Burges, C. J. C., "From RankNet to LambdaRank to LambdaMART: An Overview", Microsoft Research Technical Report, Jan. 1, 2010, 19 pages.
Rafailov, R., et al., "Direct Preference Optimization: Your Language Model is Secretly a Reward Model", Dec. 13, 2023, 27 pages.
Khattab, M., et al., "ColBERT: Efficient and Effective Passage Search via Contextualized Late Interaction over BERT", Jun. 4, 2020, 10 pages.

* cited by examiner

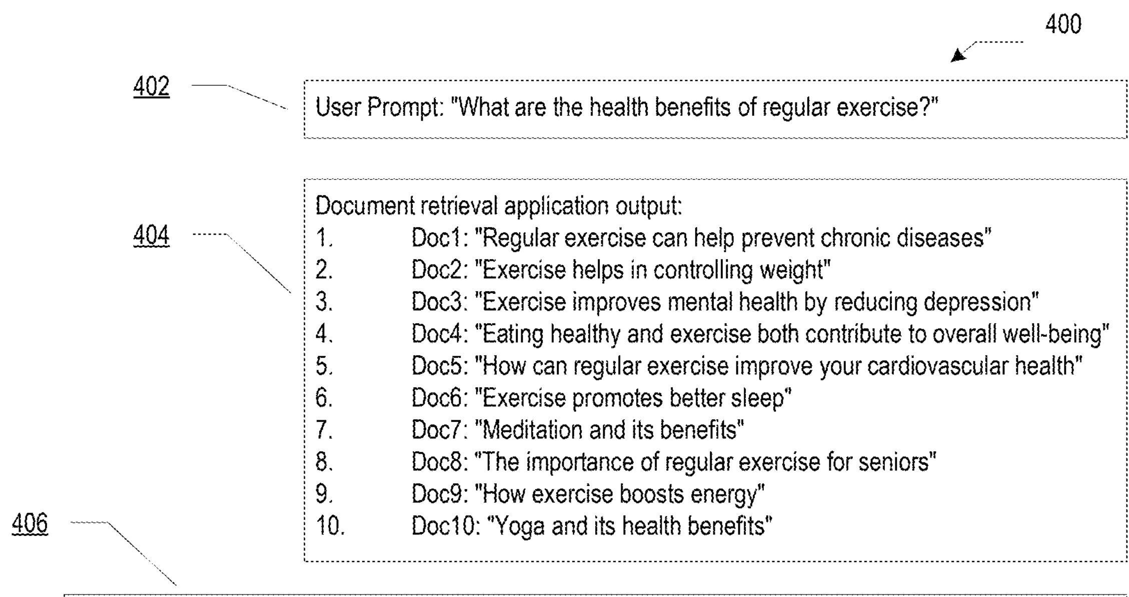

406

Document Selection LLM layer-generated ranked and re-ordered document list

1. Doc5: "How can regular exercise improve your cardiovascular health" (Relevance Score: 9.2)
2. Doc1: "Regular exercise can help prevent chronic diseases" (Relevance Score: 8.7)
3. Doc3: "Exercise improves mental health by reducing depression" (Relevance Score: 8.3)
4. Doc2: "Exercise helps in controlling weight" (Relevance Score: 7.8)
5. Doc9: "How exercise boosts energy" (Relevance Score: 7.6)
6. Doc6: "Exercise promotes better sleep" (Relevance Score: 6.9)
7. Doc8: "The importance of regular exercise for seniors" (Relevance Score: 6.8)
8. Doc4: "Eating healthy and exercise both contribute to overall well-being" (Relevance Score: 6.5)
9. Doc10: "Yoga and its health benefits" (Relevance Score: 6.2)
10. Doc7: "Meditation and its benefits" (Relevance Score: 5.7)

408

Document Selection LLM layer selects the preferred document subset from the ranked document list:
Preferred Document Subset: {Doc5, Doc1, Doc3, Doc2, Doc9}

410

The selected documents and user query are sent to the field LLM:
Input to Field LLM: User prompt + {Doc5, Doc1, Doc3, Doc2, Doc9}
The field LLM generates an answer:
Answer: "Regular exercise has numerous health benefits. It can help improve your cardiovascular health and prevent chronic diseases. It's found to be effective in controlling weight and boosting energy. Moreover, regular exercise can reduce depression and promote better sleep."

*FIG. 4*

OPTIMIZING RETRIEVAL-AUGMENTED GENERATION SYSTEMS THROUGH ENHANCED DOCUMENT SELECTION

BACKGROUND

Large language models are trained on document, image, audio, and video corpora of exabyte or petabyte scale. LLMs are pretrained prior to deployment in a workplace environment and use billions of parameters to generate output in response to queries of varying degrees of complexity. When pretrained large language models are deployed to enterprises as working models, the data used to train the models is rendered outdated over a length of time. The large language model may eventually generate outdated, incorrect, or hallucinatory answers with respect to the present context. Therefore, user queries or prompts to the large language models may be augmented with external data as additional parameters. The large language models generate answers to prompts, the answers being further informed by the external data. This manner of answer generation augmented by the additional input of external data by large language models is referred to as retrieval-augmented generation. The retrieval of external data is managed by document retrieval systems which may be distinct from the working large language model.

SUMMARY

In general, in one aspect, one or more embodiments relate to a method. The method includes applying a document ranking layer of a document selection large language model (LLM) to a document list corresponding to a training dataset to obtain a ranked document list. The document list includes multiple reference documents. The method further includes selecting a subset of reference documents from the ranked document list to obtain a document subset including a subset of the multiple reference documents and processing a user prompt from the training dataset and the document subset by a field LLM to generate an answer. The method further includes ranking the answer with an answer score by a ranking LLM. The method further includes ranking the document subset by the ranking LLM to obtain a ranked document subset. The method further includes calculating a loss function of a preference optimization layer of the document selection LLM based on the answer score and updating at least one training parameter of a foundation model of the document selection LLM based on the loss function of the preference optimization layer.

In general, in one aspect, one or more embodiments relate to a system. The system includes at least one computer processor, a data repository in communication with the at least one computer processor and stored on a physical storage device, a retrieval optimization engine executing on the at least one computer processor, a document selection LLM, including a foundation model, a document ranking layer, and a reference optimization layer, and executing on the at least one computer processor, a ranking LLM executing on the at least one compute processor, and a field LLM, executing on the at least one computer processor. The retrieval optimization engine is configured to retrieve training data from the data repository. The training data includes a training dataset. The retrieval optimization engine is configured to cause the document selection LLM executing on the at least one computer processor to apply the document ranking layer to a document list corresponding to the training dataset to obtain a ranked document list. The document list includes multiple reference documents. The retrieval optimization engine is further configured to select a subset of reference documents from the ranked document list to obtain a document subset of the multiple reference documents. The retrieval optimization engine is further configured to cause the field LLM executing on the at least one computer processor to process a user prompt from the training dataset and the document subset to generate an answer and cause the ranking LLM executing on the at least one computer processor to rank the answer with an answer score. The retrieval optimization engine is further configured to cause the ranking LLM executing on the at least one computer processor to rank the document subset to obtain a ranked document subset. The retrieval optimization engine is further configured to cause the document selection LLM executing on the at least one computer processor to calculate a loss function of the preference optimization layer, based on the answer score. The retrieval optimization engine is further configured to cause the document selection LLM executing on the at least one computer processor to update at least one training parameter of the foundation model based on the loss function of the preference optimization layer.

In general, in one aspect, one or more embodiments relate to a method. The method includes receiving a request including a new prompt and retrieving a new document list corresponding to the new prompt from a document retrieval application. The new document list includes multiple new reference documents. The method further includes processing the new document list to obtain a preferred document subset including a subset of new reference documents of the multiple new reference documents of the new document list. The preferred document subset is ordered in decreasing relevance of new reference documents of the preferred document subset. The method further includes processing the new prompt and the preferred document subset by a field LLM to obtain an answer corresponding to the new prompt and transmitting the answer as a response to the request.

Other aspects of one or more embodiments will be apparent from the following description and the appended claim.

BRIEF DESCRIPTION OF DRAWINGS

FIG. 4 shows an example of answer generation by a field large language model with reference documents selected by a document selection large language model, in accordance with one or more embodiments.

Like elements in the figures are denoted by like reference numerals for consistency.

DETAILED DESCRIPTION

Figure 1:
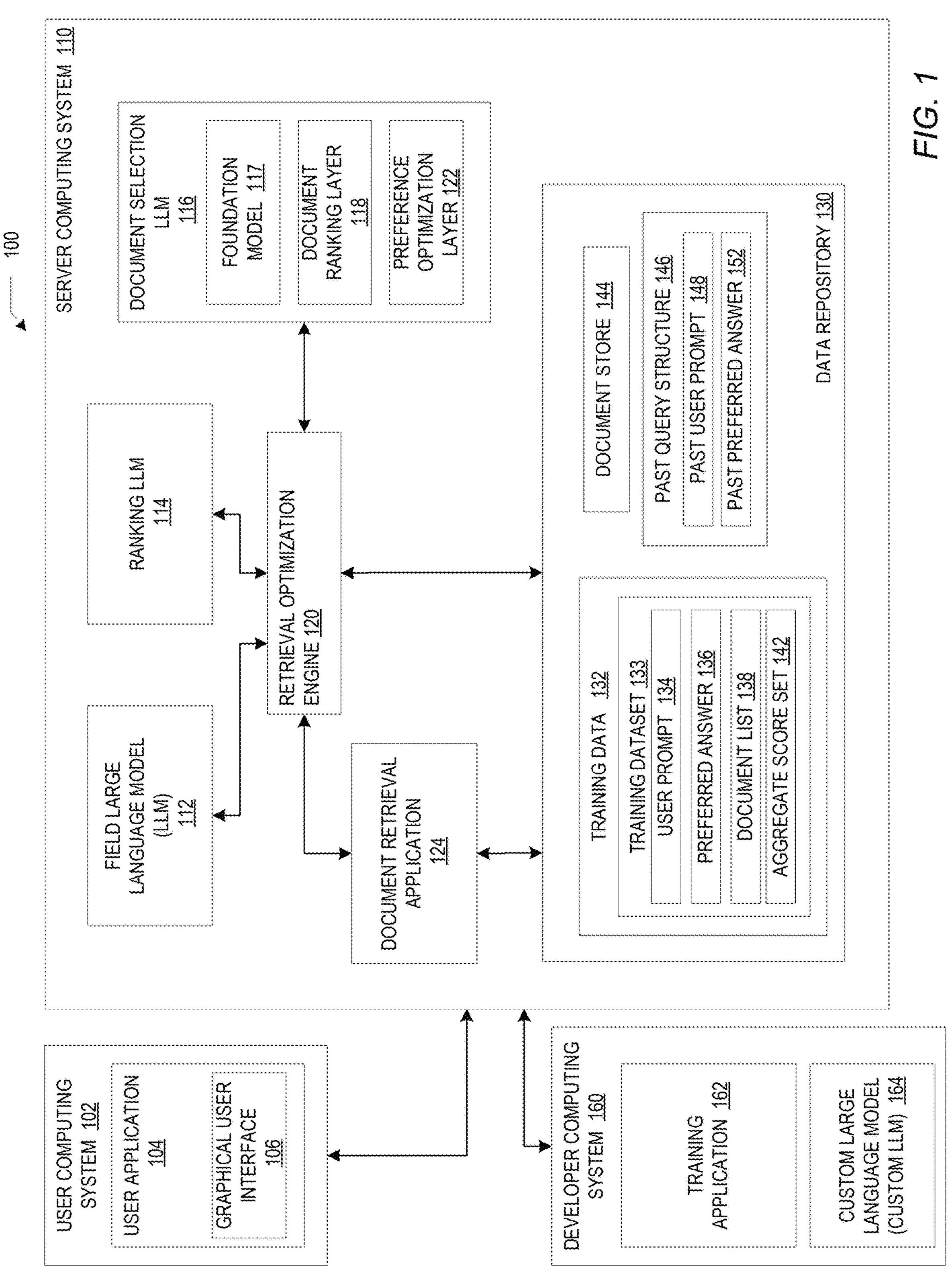
FIG. 1 shows a computing system, in accordance with one or more embodiments.

In general, embodiments are directed to optimizing retrieval-augmented generation (RAG) systems through enhanced document selection. RAG refers to a process of improving the output of a large language model (LLM) deployed in the work environment of an enterprise by providing additional, relevant reference data to a user input, or prompt. In a RAG framework, the answer generation process of LLMs is augmented with additional reference documents. Prior to an LLM processing a user prompt, the user prompt is utilized to retrieve external documents relevant to the user prompt from one or more additional external data sources by a data retrieval application, or component, within the RAG framework. External documents refer to documents that are external to the LLM's individual knowledge base. For example, external documents may include data from an enterprise's one or more proprietary knowledge bases, content stores, databases, etc. The retrieved documents, whether internal or external, may be referred to as reference documents. The user prompt, along with the reference documents, is provided to the LLM. The LLM uses the reference documents and its individual knowledge base to generate a better informed response to the user prompt.

The present disclosure includes multiple LLMs. One of the LLMs is a document selection LLM, trained using embodiments described herein to select reference documents for sending to another LLM (i.e., a field LLM). The document selection LLM may be deployed together with one or more field LLMs in the RAG framework. A field LLM is an LLM deployed into the work environment of an enterprise. The document selection LLM optimizes a reference document list. The reference document list is obtained by a data retrieval application within the RAG framework based on a user prompt. More particularly, the document selection LLM selects and orders a subset of reference documents from the reference document list. The selected and ordered subset of reference documents from the document selection LLM is provided as additional input along with a user prompt to the field LLM.

The training of the document selection LLM entails causing the document selection LLM to select various subsets of reference documents from the document list. The selected subsets are processed by the field LLM with the training user prompt to obtain respective candidate answers. The candidate answers are compared to a preferred training answer corresponding to the training user prompt and assigned answer scores. The document selection LLM is trained to select the subset of reference documents corresponding to the candidate answer having a highest answer score value as a preferred subset of reference documents.

Optimizing RAG systems is an approach responsive to challenges arising from current implementations of RAG frameworks. For instance, a challenge exists in assessing the quality of the retrieved reference documents, and consequently, the answer quality of the field LLM. Further, diverse formats of enterprise-owned data such as files, database records, images, video and audio libraries, long-form text, etc., present a challenge to convert to a format suited for the specific task of relevancy search. Relevancy search is a technique for data retrieval in systems implementing the RAG approach. The relevancy of a reference document to the user prompt is based on a similarity between the reference document and the user prompt. Relevancy searches are challenging to implement at scale for organizations storing vast amounts of information. Alternatives to relevancy search (e.g., keyword search solutions) may not return results for knowledge-intensive tasks.

Further, data retrieval applications in a RAG framework face a limitation of context size. Limited context size refers to computing-resource-related constraints on the amount of text or tokens, in other words, how much query and document information a data retrieval application may have the capacity to handle. Limited context size may result in retrieval of redundant, or overlapping, reference documents (i.e., documents with substantially similar information), or false-positive retrievals (i.e., documents that are purportedly relevant, but in actuality, include little to no relevant information to the user prompt). Additionally, the document order presented to LLMs significantly influences answer generation. Therefore a sub-optimal ordering of reference documents presented to the working LLM may introduce a risk of perpetuating biased selections. Addressing these challenges entails a systematic approach to optimizing document selection and reordering in RAG implementations.

Attention is now turned to the figures. FIG. 1 shows a system (100), in accordance with one or more embodiments. The system (100) includes a server computing system (110). The server computing system (110) is communicatively coupled to a user computing system (102) and a developer computing system (150). The server computing system (110) is one or more computer processors, data repositories, communication devices, and supporting hardware and software. An example of one or more computer processors that may be part of the server computing system (110) is the computer processor(s) (502) described in reference to FIG. 5A. The server computing system (110) may be in a distributed computing environment. The one or more processors of the server computing system (110) may execute computer readable program code that defines one or more applications, including a retrieval optimization engine (120). Moreover, the server computing system is configured to execute additional applications, including a field LLM (112), a ranking LLM (114), a document selection LLM (116), and a document retrieval application (124). An example of a computer system and network that may form the server computing system (110) is described with respect to FIG. 5A and FIG. 5B.

As shown in FIG. 1, the server computing system (110) includes a data repository (130). The data repository (130) is a type of storage unit or device (e.g., a file system, database, data structure, or any other storage mechanism) for storing data. The data repository (130) may include multiple different, potentially heterogeneous, storage units and/or physical storage devices. An example of a physical storage device that may be part of the server computing system (110) is the persistent storage device(s) (506) described in reference to FIG. 5A.

The data repository (130) is operably and communicably coupled to the retrieval optimization engine (120) and the document retrieval application (124). The data repository (130) includes a document store (144). In one embodiment, the document store (144) includes multiple reference documents. The multiple reference documents may be from enterprise databases and knowledge databases and may include public or proprietary information. The reference documents may be in diverse formats, (e.g., text, audio, video, database record files, etc.). More particularly, the document store (144) may include vector embeddings corresponding to reference documents, in one or more embodiments. A vector embedding is a compact representation of raw data, transformed into a numerical vector. Raw data can be text or images. Vector embeddings can capture similarities, and semantic relationships of the raw data, facilitating mathematical operations and comparisons. When the document store (144) is searched for reference documents, the vector embeddings corresponding to the reference documents are compared with a vector embedding corresponding to a user prompt to determine a similarity score. A higher similarity score is representative of a higher relevancy of a corresponding reference document to the user prompt. The terms "vector embedding" and "embedding" may be interchangeably used in the current specification and refer to representations of raw text or image data.

The data repository (130) further includes multiple past query structures (146). The past query structure (146) included in the data repository (130) as shown in FIG. 1 is representative of at least one past query structure (146) in the data repository (130), or multiple past query structures (146). In one embodiment, a past query structure (146) includes at least a past user prompt (148) and a past preferred answer (152). In one or more embodiments, the past query structure (146) may include other fields and information.

The past user prompt (148) is representative of a user prompt (148) previously input to the field LLM (112). The past preferred answer (152) is representative of an answer generated by the field LLM (112) in response to the past user prompt (148). More particularly, the past preferred answer (152) is an exemplary answer to the user prompt (148). In other words, the past preferred answer (152) is considered to be the most relevant answer to the user prompt (148) and is used as a benchmark during a training phase of the document selection LLM (116)

The data repository (130) further includes training data (132). The training data (132) includes multiple training datasets (133). The training dataset (133) shown in FIG. 1 is representative of one or more training datasets. A training dataset (133) includes a user prompt (134), a preferred answer (136), a document list (138) and an aggregate score set (142). A training dataset (133) is generated during an initial phase of training data creation. The training data (132) is created prior to training the document selection LLM (116) and is used to train the document selection LLM (116).

The user prompt (134) and preferred answer (136) of the training dataset (133) correspond respectively to a past user prompt (148) and past preferred answer (152) to the particular past user prompt (148) obtained from a past query structure (146). The document list (138) includes multiple reference documents. The reference documents are obtained by the document retrieval application (124) from the document store (144), based on the user prompt (134). That is, the document list (138) includes reference documents that are relevant to the user prompt (148). The aggregate score set (142) includes multiple aggregate scores. Each aggregate score corresponds to a respective reference document of the document list (138). For example, a one-to-one mapping may exist between and aggregate score and a reference document in the document list.

An aggregate score is a score of (i) an answer ranking score of a generated answer based on a reference document, aggregated with (ii) a document ranking score of the corresponding reference document. The generation of the aggregate score set (142) and the creation of the training dataset (133) is described in more detail in reference to the flowchart 300, shown in FIG. 3.

The server computing system (110) further includes a document retrieval application (124). The document retrieval application (124) is communicably and operably coupled to the data repository (130) and the retrieval optimization engine (120). The document retrieval application (124) retrieves documents from the document store (144), based on a user prompt. In one embodiment, the user prompt originates from a user computing system (102) via a user application (104). In other embodiments, in an initial phase of training data creation, the user prompt is a past user prompt (148) obtained from a past query structure (146).

As a general overview, document retrieval applications perform similarity comparisons between prompt embeddings and document embeddings in a document store (144). The document embeddings with a higher similarity score (for example, above a similarity score threshold) are retrieved. A high similarity score between a document embedding and a prompt embedding is indicative of the relevance of corresponding reference document to the corresponding prompt. In other words, the relevance of a reference document with respect to a prompt is based on the similarity (score) of the corresponding document embedding to the prompt embedding.

Document retrieval applications are implementations of document retrieval architectures. Some examples of document retrieval architectures include dual encoders, such as asymmetric dual encoders, and sparse models, such as the Learned Sparse Retrieval (LSR) framework, and bi-encoders, such as Contextual Late Interaction Bidirectional Encoder Representations from Transformers (colBERT).

The server computing system (110) further includes a field LLM (112). As shown in FIG. 1, the field LLM (112) is operably and communicably coupled to the retrieval optimization engine (120). However, other architectural arrangements are possible. The field LLM (112) is an LLM that is deployed in the working environment of an enterprise hosting the server computing system (110) of FIG. 1. In other words, the field LLM (112) is the LLM that responds to user queries from users in the enterprise.

The field LLM (112) may be a foundation LLM further trained on enterprise-specific knowledge bases. Foundation LLMs are machine learning or deep learning models trained on broad data. Foundation models serve as base models for diverse applications, bypassing the need to originate a model for each new application domain. Foundation models can be fine-tuned for specific purposes. Examples of foundation LLMs include ChatGPT, BERT, etc. Additionally or alternatively, the field LLM (112) may be a proprietarily developed and owned LLM by an organization.

The server computing system (110) further includes a ranking LLM (114). As shown in FIG. 1, the ranking LLM (114) is communicatively and operatively coupled to the retrieval optimization engine (120). However, other architectural arrangements are possible.

The ranking LLM (114) is a ranking language model that evaluates and scores candidate answers generated by another LLM, for example, the field LLM (112). The assessment of the candidate answers is based on various criteria (e.g., relevance to the input prompt corresponding to the candidate answer, coherence, factual accuracy). The candidate answers are assigned scores, and the candidate answer with the highest score is considered as the preferred answer.

Additionally or alternatively, the ranking LLM (114) may be configured to rank candidate answers based on a preselected preferred answer, provided as additional input. Again, the ranking LLM (114) ranks the candidate answers based on a comparison of a candidate answer to the preselected preferred answer and assigns scores to candidate answers based on their similarity to the pre-selected preferred answer.

The ranking LLM (114) further includes functionality to rank reference documents. The reference documents are documents retrieved by the document retrieval application (124) from the document store (144), as a document list (138). The ranking LLM (114) ranks the reference documents with a relevance score based on (i) their relevance to the pre-selected preferred answer corresponding to the user prompt, and (ii) their relevance to the user prompt. Ranking of reference documents is based on factors of correctness, faithfulness, and accuracy. Correctness of a reference document is a measure of the alignment of the candidate answer to the preferred answer, the candidate answer being generated using the reference document as additional data. Faithfulness is an assessment of the candidate answer against the reference document, to verify that the answer does not include information that is not in the reference document (i.e., the answer is not hallucinatory). Finally, context relevancy is an evaluation of the relevancy of the candidate answer and the reference document respectively, to the user prompt. Ranking of reference documents by the ranking LLM (114) increases the relevance of the finally selected reference documents in a RAG framework. Examples of ranking LLMs include ChatGPT4.

The server computing system (110) further includes a document selection LLM (116). The document selection LLM (116) is an LLM that is trained to optimize a document list (138) for answer generation by a field LLM (112) in a RAG framework. As shown in FIG. 1, the document selection LLM (116) is operatively and communicatively coupled to the retrieval optimization engine (120). However, other architectural arrangements are possible.

The document selection LLM (116) includes a foundation model (117), a document ranking layer (118), and a preference optimization layer (122). The foundation model (117) is an LLM trained on broad data. The foundation model (117) is the underlying language model that is fine-tuned via the document ranking layer (118) and the preference optimization layer (122). An example of a foundation model is GPT-3.

The document ranking layer (118) is a programmatic implementation of a learned-ranking algorithm. One example of a learned-ranking algorithm is LambdaMART. However, other learned-ranking algorithms may be implemented, for example, Rank Support Vector Machines (SVM), RankBoost, ListNet, etc.

The LambdaMART algorithm is based on a foundation ranking algorithm (i.e., RankNet). The foundation ranking algorithm is based on neural networks, or other differential models. The goal of the foundation ranking algorithm is to learn a ranking function that minimizes the difference between the relevance scores of individual reference documents, (e.g., the difference between the relevance score of reference document 1 and the relevance score of reference document 2).

Further, an additional optimization may be added to the foundation ranking algorithm when a cost function is introduced based on the gradient of the ranking measure. The cost function encourages the model to prioritize reference documents with larger gradients. The learned-ranking function is optimized by minimizing the cost function. An example of a foundation ranking algorithm optimized in this manner is LambdaRank. An example of a cost function is Normalized Discounted Cumulative Gain (NDCG). NDCG assesses the quality of the ranking by evaluating the effectiveness of an ordered list of results. Notably, NDCG combines both the relevance and the position of each result in the list. NDCG compares the ranking of the result list to an ideal order where all relevant items are at the top of the list. Each item is graded based on a score (e.g., 1 to 10).

Additionally, a method of learning the optimized ranking function may be added to the optimized ranking algorithm. LambdaMART is one example of learning the optimized ranking function described hereinabove. LambdaMART uses boosted decision trees to learn the optimized ranking function.

Boosted decision trees are an ensemble learning technique used in machine learning. Ensemble learning combines multiple models to create a stronger overall model. Namely, ensemble methods aggregate predictions of multiple weak models to improve accuracy of the overall model. In boosted decision trees, the "weak" model is a decision tree. The strong model includes multiple weak models, i.e., multiple decision trees. The boosted decision tree uses gradient boosting as a specific type of ensemble learning. In gradient boosting, a new decision tree is trained to predict the error of the current strong model and the predictions are added to the strong model to reduce the overall error. The process repeats until a stopping criterion is met.

Figure 2:
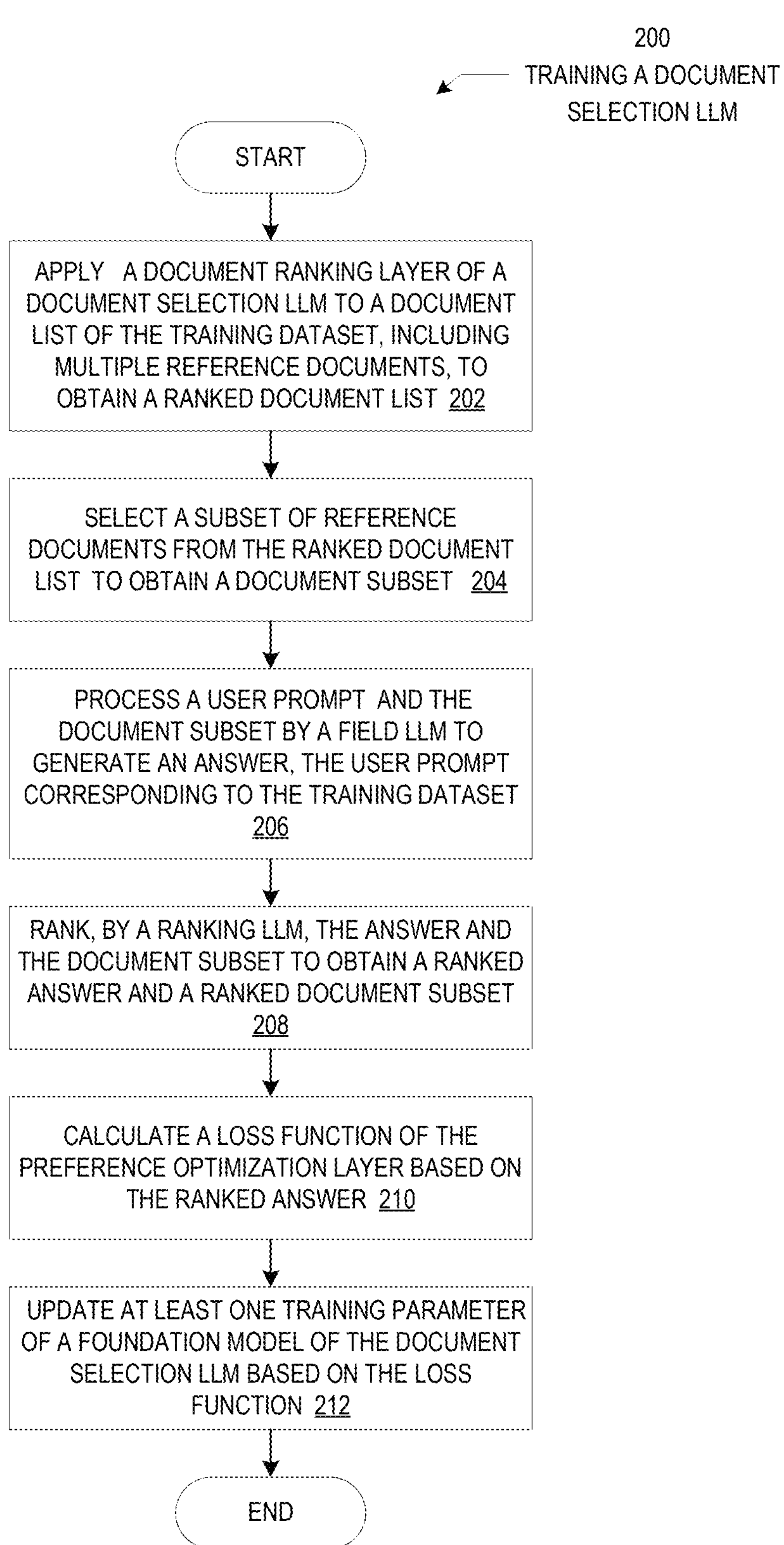
FIG. 2 and FIG. 3 show flowcharts in accordance with one or more embodiments.

The document ranking layer implementation and the NDCG calculation are described in further detail in reference to the flowchart 200 of FIG. 2.

The document selection LLM (116) further includes a preference optimization layer (122). The preference optimization layer (122) is a programmatic implementation of a preference optimization model, or algorithm. One example of a preference optimization algorithm is Direct Preference Optimization (DPO). However, other preference optimization algorithms may be implemented, for example, Identity Preference Optimization (IPO), Kahneman-Tversky Optimization (KTO), etc. The terms "model" and "algorithm" are used interchangeably in the current specification to refer to the preference optimization layer's underlying functionality.

LLMs are typically trained by unsupervised training. However, precise control of LLM behavior is a challenge due to the unsupervised nature of the training. LLMs are fine-tuned using reinforcement learning from human feedback (RLHF). Namely, a response from the LLM is rated "good" or "bad" during human-operated fine-tuning and the LLM is trained to predict a generated response as "good" or "bad" based on the human ratings. In a machine-learning environment, preference optimization algorithms fine-tune LLM behavior. As implemented in the document selection LLM (116), the preference optimization layer (122) uses a preference optimization model, or algorithm, to fine-tune the foundation model (117) of the document selection LLM (116).

The preference optimization layer (122) fine-tunes the underlying foundation model (117) by updating one or more training parameters of the foundation model (117) by gradient descent to minimize a loss function. Gradient descent is an optimization method to determine the minimum or maximum of a multi-variable function. In the context of preference optimization algorithms, the gradient descent method iteratively adjusts the foundation model training parameters to minimize the loss function of the preference optimization algorithm. An example of a loss function used in preference optimization algorithms is a binary cross-entropy function. The description of fine-tuning the foundation model is described in further detail in reference to the flowchart 200 of FIG. 2.

The server computing system (110) further includes a retrieval optimization engine (120). The retrieval optimization engine (120) is operably and communicably coupled to the data repository (130), the document retrieval application (124), the field LLM (112), the ranking LLM (114), and the document selection LLM (116). The retrieval optimization engine (120) is a set of programs and computer-readable code, including functionality to orchestrate the components of the server computing system (110) to optimize document selection for the retrieval-augmented generation process implemented by the server computing system (110).

The system (100) of FIG. 1 further shows a user computing system (102). The user computing system (102) is communicably coupled to the server computing system (110). The user computing system (102) includes a user application (104). The user application (104) further includes a graphical user interface (GUI) (106) which presents the user with various GUI artifacts, for example, forms, dialog boxes, tables, etc., to enter information or otherwise interact with the user application (104). The user application (104) is configured to generate user prompts with information obtained from a user who transmits the user prompts to the server computing system (110). The server computing system (110) transmits an answer in response to the prompt. When the answer is presented to the user in response to the user prompt, the user may select the answer as a preferred answer. In one or more embodiments, the user prompt-preferred answer pair may be stored in corresponding past query structures as a past user query-past preferred answer pair.

The system (100) of FIG. 1 further shows a developer computing system (160). The developer computing system (160) is communicably coupled to the server computing system (110). The developer computing system (160) includes a training application (162). The training application (162) is used to train a custom LLM (164). In one or more embodiments, the trained custom LLM (164) may be deployed as the field LLM (112) in the server computing system (110).

While FIG. 1 shows a configuration of components, other configurations may be used without departing from the scope of one or more embodiments. For example, various components may be combined to create a single component. As another example, the functionality performed by a single component may be performed by two or more components.

Attention is now turned to FIG. 2. FIG. 2 shows a flowchart for training the document selection LLM, in accordance with one or more embodiments. More particularly, the document selection LLM is trained to optimize a list of reference documents. The output of the document selection LLM, when trained in accordance with the flowchart 200, is a ranked subset of reference documents, ordered from highest to lowest ranked reference documents. The method of FIG. 2 may be implemented using the system of FIG. 1 and one or more of the steps may be performed on or received at one or more computer processors.

While the various Blocks in the flowchart 200 are presented and described sequentially, at least some of the steps may be executed in different orders, may be combined, or omitted, and at least some of the steps may be executed in parallel, or iteratively. Furthermore, the steps may be performed actively or passively.

The flowchart 200 starts at Block 202. At Block 202, the document ranking layer of the document selection LLM is applied to a document list of a training dataset to obtain a ranked document list.

One or more embodiments may include a pre-processing step, (not shown), of retrieving training data from a data repository. In the pre-processing step, the retrieval optimization engine may retrieve the training data from the data repository stored on a physical storage device. The training data includes one or more training datasets. A training dataset includes a user prompt, a preferred answer, a document list, and an aggregate score set. The document list includes multiple reference documents. Aggregate scores of the aggregate score set correspond to respective reference documents of the document list.

Returning to Block 202, in one embodiment, in the document ranking layer, the aggregate scores corresponding to the respective reference documents of the document list are used to calculate the normalized discounted cumulative gain (NDCG) of the document list. Discounted cumulative gain (DCG) is a measure of ranking quality of information retrieval applications. When normalized for comparability across queries, the resulting normalized discounted cumulative gain is a measure of the effectiveness of ranking of reference documents. More particularly, DCG sums the usefulness, or gain of the results (i.e., reference documents), discounted by their respective positions in the result list (i.e., document list). NDCG is DCG normalized by the maximum possible DCG of the result set when ranked from highest to lowest gain, thus adjusting for the different numbers of relevant results for different queries.

In one embodiment, the normalized discounted cumulative gain of the document list is calculated based on Equation 1:

$$nDCG_p = \frac{DCG_p}{IDCG_p} \tag{1}$$

$$\text{where } DCGp = \sum_{i=1}^{p} \frac{2^{rel_i} - 1}{\log_2(i+1)} \tag{2}$$

$$\text{and } IDCG_p = \sum_{i=1}^{|REL_p|} \frac{2^{rel_i} - 1}{\log_2(i+1)} \tag{3}$$

In Equation (1), $nDCG_p$ is the normalized discounted cumulative gain of a reference document at position p in a document list. $DCG_p$ is the discounted cumulative gain of a reference document at position p in a document list. $IDCG_p$ is the ideal discounted cumulative gain of a reference document at position p in a document list. In equation (2), $rel_i$ represents the relevance of the reference document at position I of the document list. Notably, $rel_i$ corresponds to the aggregate score of the reference document.

The document lists corresponding to a user prompt vary in list length, or size, based on the prompt, effecting a requirement for a normalized discounted cumulative gain across user queries. To calculate the NDCG, an ideal DCG, or IDCG is calculated. In one embodiment, the IDCG is calculated in accordance with equation (3). In equation (3), $IDCG_p$ is the ideal discounted cumulative gain of a reference document at position p. $|REL_p|$ represents the list of reference documents, ordered by relevance, of a corpus of reference documents up to position p, and $rel_i$ is the graded relevance of the reference document at position i. Notably, the corpus of reference documents refers to the set of reference documents obtained from each document list corresponding respectively to each training dataset of the training data.

The output of Block 202 is a ranked document list of reference documents in monotonically decreasing order of relevance scores of the reference documents. While the detailed description of one embodiment of Block 204 is in reference to the LambdaMART algorithm, in other embodiments, other learned-ranking algorithms and ranking metrics may be used At Block 204, a subset of reference documents from the ranked document list is selected to obtain a document subset. At Block 206, the user prompt corresponding to the training dataset is processed along with the document subset obtained in Block 204 by the field LLM. The field LLM generates an answer in response to the user prompt, where the answer is informed by supplemental information from the document subset.

At Block 208, the ranking LLM ranks the answer and the document subset. In one embodiment, the ranking LLM receives as answer parameters, the answer, and a preferred answer corresponding to the training dataset. Additionally, the ranking LLM receives an answer ranking instruction to rank the answer based on the similarity of the answer to the preferred answer. The ranking LLM processes the answer ranking instruction and the answer parameters and compares the answer obtained in Block 208 with a preferred answer corresponding to the training dataset. In one embodiment, the ranking LLM assigns an answer score to the answer based on a similarity of the answer to the preferred answer of the training dataset. In one embodiment, the answer score may be a number in the inclusive range {1 to 10}.

Additionally, the ranking LLM ranks the document subset. In one embodiment, the ranking LLM receives as document parameters, the document subset and the preferred answer corresponding the training dataset. The ranking LLM further receives a document ranking instruction to rank each reference document of the document subset based on the relevance of the respective reference document to (i) the user prompt, and (ii) the preferred answer. In one embodiment, the ranking LLM processes the document parameters in accordance with the document ranking instruction and assigns a document ranking score to each reference document of the document subset. Further, the ranking LLM reorders the reference documents of the document subset based on document ranking scores corresponding to the reference documents of the document subset. The ranking LLM outputs the ranked answer and ranked document subset.

At Block 210, a loss function of the preference optimization layer of the document selection LLM is calculated. In one or more embodiments, the loss function may be a binary cross-entropy loss function. Binary cross-entropy loss functions are used in machine learning for binary classification problems, quantifying the dissimilarity between the predicted probability distribution and the true binary labels of a dataset. In the context of the preference optimization layer, the true binary label corresponds to the preferred answer, and may be represented by binary value 1. The predicted probability corresponds to the answer score corresponding to the answer, obtained in Block 208. For example, if an answer score value of an answer is 9, then the measure of similarity of the answer to the preferred answer may be equated to 90%. In the scenario where the true label is represented by binary value 1, the loss function penalizes lower predicted probabilities. In other words, answer scores with lower values are penalized, and answer scores with higher values are rewarded. Further, the calculated loss function value decreases in relation to an increase in answer score value.

At Block 212, at least one training parameter of the foundation model of the document selection LLM is updated based on the loss function. In one or more embodiments, one or more training parameters of the foundation model are updated in accordance with a gradient descent algorithm. More particularly, the change in the loss function guides the update of the foundation model training parameters (e.g., weights and biases) to minimize the loss function. In other words, the gradient descent algorithm adjusts the foundation model training parameters in the direction that minimizes the loss function.

In one or more embodiments, the steps of Blocks 206, 208, 210, and 212 are iterated for the various document subsets of the document list of the training dataset. Accordingly, multiple answers are generated by the field LLM processing the user query along with the document subsets. Each answer corresponds to a document subset. The document subsets are ranked by the ranking LLM over the iterations of the steps of Blocks 206-212 to generate a set of ranked document subsets and corresponding ranked answers. Each ranked answer has a corresponding answer score. In one or more embodiments, the loss function of the preference optimization layer of the document selection LLM is calculated in successive iterations based on answer scores corresponding to ranked answers of successive iterations. Further, the at least one training parameter of the foundation model may be updated in successive iterations based on the loss function, more specifically, in a manner to minimize the loss function of the preference optimization layer. Further, the at least one updated training parameter of the foundation model aligns, or causes, the foundation model to select a ranked document subset corresponding to a ranked answer with a highest answer score value, as a preferred document subset.

In one or more embodiments, the endpoint of the training process may depend on factors such as convergence, performance, and available resources. In one example, the endpoint is reached based on the early stopping method, stopping the training when the performance between two consecutive iterations is stable. Early stopping is a technique used in training iterative machine learning models such as neural networks to prevent overfitting. A performance evaluation scheme is selected. In one embodiment, the loss function value change is selected. If the loss function value change stops decreasing, or increases between successive iterations, training is halted. The flowchart 200 ends at Block 212.

Figure 3:
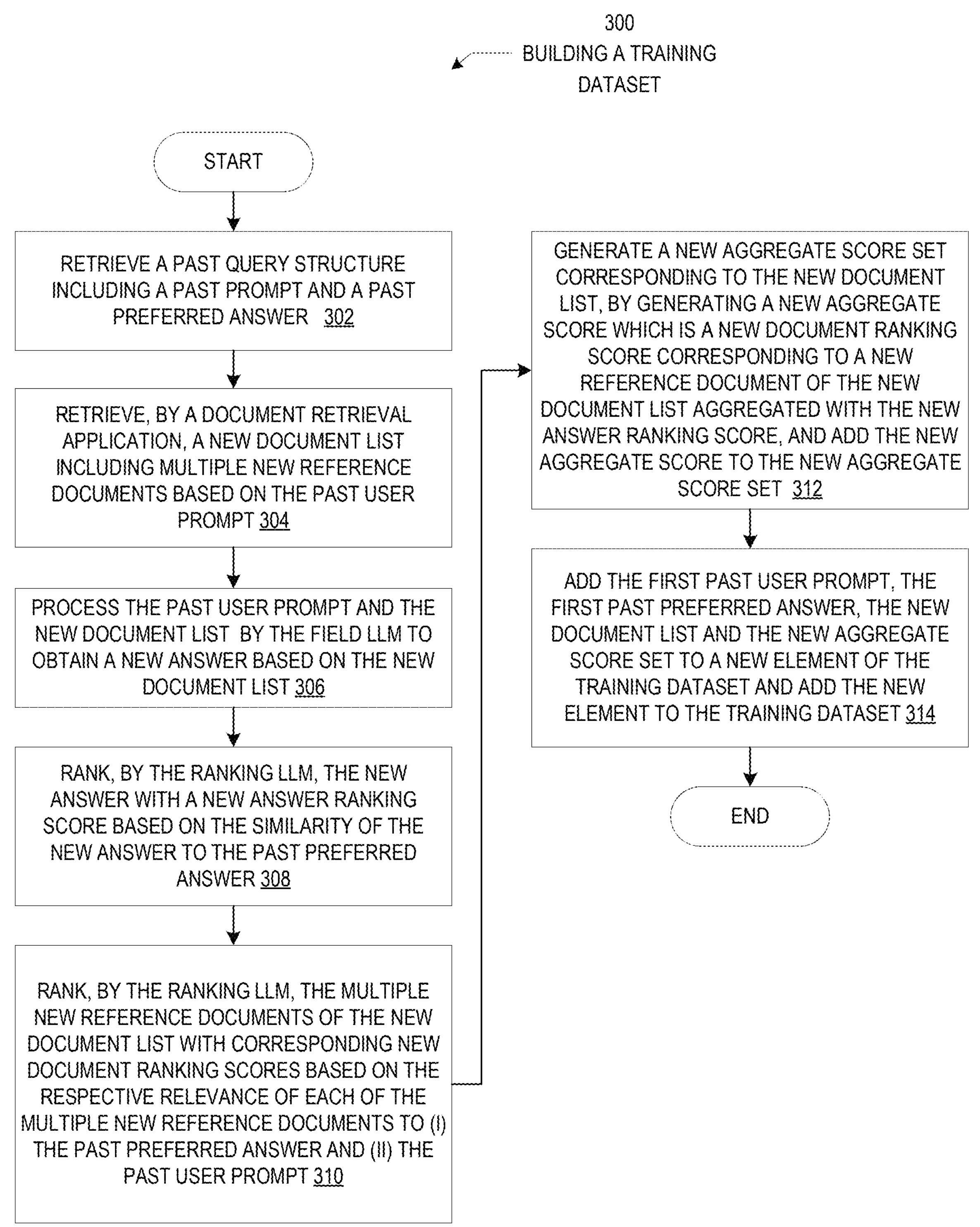

Attention is now turned to FIG. 3. FIG. 3 shows a flowchart for creating a training dataset for training the document selection LLM, in accordance with one or more embodiments. The flowchart of FIG. 3 may be implemented using the system of FIG. 1 and one or more of the steps may be performed on or received at one or more computer processors.

While the various steps in the flowchart 300 are presented and described sequentially, at least some of the steps may be executed in different orders, may be combined, or omitted, and at least some of the steps may be executed in parallel, or iteratively. Furthermore, the steps may be performed actively or passively.

The flowchart 300 starts at Block 302. At Block 302, a past query structure is retrieved from the data repository stored on a physical storage device. The past query structure includes a past user prompt and a past preferred answer. In one embodiment, the retrieval optimization engine retrieves a past query structure in an initial phase of creating training data for the purpose of training the document selection LLM.

At Block 304, a new document list of reference documents is retrieved. The new document list includes reference documents that are relevant to the past user query. In one embodiment, the retrieval optimization engine provides the document retrieval application with the past user prompt. The document retrieval application retrieves documents relevant to the past user prompt from the document store in the data repository.

At Block 306, the past user prompt and the new document list obtained in Block 304 are processed by the field LLM. The field LLM generates a new answer to the past user prompt. The new answer is supplementally informed by information obtained from the reference documents of the new document list.

At Block 308, the new answer generated in Block 306 is ranked by the ranking LLM with a new answer ranking score. In one or more embodiments, the ranking LLM receives as new answer parameters, the past user prompt, the past preferred answer, and the new answer. Additionally, the ranking LLM receives a new answer ranking instruction to rank the new answer based on the similarity of the new answer to the past preferred answer. Additionally or alternatively, the ranking LLM may rank the new answer based on factors such as factual correctness and relevance to the past user prompt. The ranking LLM assigns a new answer ranking score to the new answer. In one embodiment, the new answer ranking score may be a number in the inclusive range {1 to 10}.

At Block 310, the ranking LLM ranks the multiple new reference documents of the new document list. The ranking LLM assigns the multiple new reference documents of the new document list with corresponding multiple new document ranking scores. In one embodiment, the ranking LLM receives, as new document parameters, the past preferred answer, and the new document list. Additionally, the ranking LLM receives a new document ranking instruction to rank the new reference documents of the new document list based on a relevance of the respective new reference documents with respect to the (i) past preferred answer and (ii) the past user prompt. The ranking LM assigns a new document ranking score to each new reference document of the new document list. In one embodiment, the new document ranking score may be a number in the inclusive range {1 to N}, N being the number of new reference documents in the new document list. In other words, the N new reference documents in the new document list are ranked from 1 to N.

At Block 312, a new aggregate score set is generated. The new aggregate score set includes multiple new aggregate scores. Further, the new aggregate score set corresponds to the new document list. In one or more embodiments, a new aggregate score corresponding to a new reference document of the new document list is determined as the new document ranking score corresponding to the new reference document of the new document list, aggregated with the new answer ranking score corresponding to the new answer generated by the field LLM, obtained in Block 308. In one or more embodiments, the new aggregate score may be a simple average of the new document ranking score and the new answer ranking score. The new aggregate score is added to the new aggregate score set. In one or more embodiments, Block 312 may be iterated to create the new aggregate score set corresponding to the new document list, each new aggregate score of the new aggregate score set corresponding to a respective new reference document of the new document list.

At Block 314, a new training dataset is created. In one embodiment, the past user prompt is added to the new training dataset as a user prompt of the training dataset. In an equivalent manner, the past preferred answer, the new document list, and the new aggregate score set are added to the new training dataset as the preferred answer, document list, and aggregate score set, respectively. Finally, the new training dataset is added to the training data. The flowchart 300 ends at Block 314.

In one or more embodiments, the system 100 may implement the flowchart 300 in an initial phase, creating the training dataset from past query structures by retrieving documents and ranking the retrieved documents. Further, the system 100 may implement the flowchart 200 in a training phase, training the document selection LLM document ranking layer and preference optimization layer to obtain ranked and ordered document lists with high relevance to user prompts.

In a deployment phase, the trained document selection LLM is deployed in the working environment of an enterprise. The document selection LLM is deployed to operate in conjunction with the field LLM and the document retrieval application. In one or more embodiments, a new prompt intended for the field LLM is received as a request from a user computing system. The retrieval optimization engine triggers the document retrieval application to retrieve relevant documents from a document store in the data repository. The documents are relevant to the new prompt. Further, the retrieval optimization engine triggers the document selection LLM to optimize the document list by ranking and reordering a subset of high relevancy reference documents from the document list to obtain a preferred document subset. Subsequently, the user query and the preferred document subset are processed by the field LLM, and the generated answer is transmitted as a response to the request from the user computing system. The trained document selection LLM mimics the ranking capabilities of the ranking LLM, with improvements in performance metrics of speed and optimal usage of computing resources. Further, the document selection LLM returns an ordered document list, the order of the document list monotonically decreasing with respect to the relevance of the reference documents. The order of the document list triggers the field LLM to utilize the documents of higher relevance to the new prompt to generate an answer to the new prompt.

FIG. 4 shows an example of a workflow of optimized retrieval-augmented generation of an answer in response to a user prompt by a field LLM, in accordance with one or more embodiments. The following example is for explanatory purposes only and not intended to limit the scope of one or more embodiments.

Reference numeral 402 indicates a user prompt, namely "What are the health benefits of regular exercise." The user prompt is retrieved by the server computing system and the retrieval optimization engine sends the user prompt to the document retrieval application. The document retrieval application returns a document list, indicated by reference numeral 404. The document list has ten documents, shown as listed in numerical order. At this stage in the workflow, the relative relevance of the documents in the document list is yet to be determined. The document list indicated by reference numeral 404 is sent to the document selection LLM for processing. Reference numeral 406 indicates the output of the document selection LLM. The document selection LLM output is a ranked and reordered document list. The document list shows the relevance scores of each document. The document list is ordered in monotonic decreasing relevance. In one or more embodiments, the document ranking layer of the document selection LLM ranks and reorders the document list.

The second layer of the document selection LLM, namely, the preference optimization layer is activated when the output indicated by reference numeral 406 is obtained. The preference optimization layer selects an optimal subset of the documents from the ranked document list, namely, {Doc5, Doc1, Doc3, Doc2, Doc9}. Reference numeral 408 indicates the selected document subset. Notably, the documents of the selected optimal, or preferred document subset correspond to the top five documents in the ranked document list indicated by reference numeral 406.

Reference numeral 410 indicates the final form of the prompt sent to the field LLM by the retrieval optimization engine. The prompt includes the original user prompt, and the additional reference documents of the preferred document subset. The field LLM generates an answer, namely, "Regular exercise has numerous health benefits. It can help improve your cardiovascular health and prevent chronic diseases. It is found to be effective in controlling weight and boosting energy. Moreover, regular exercise can reduce depression and promote better sleep."

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
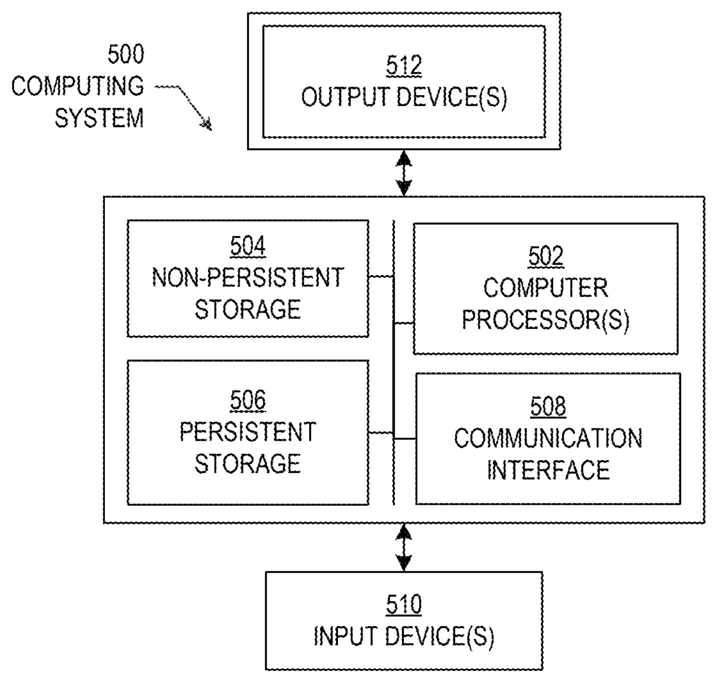
FIG. 5A and FIG. 5B show a computing system in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many diverse types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
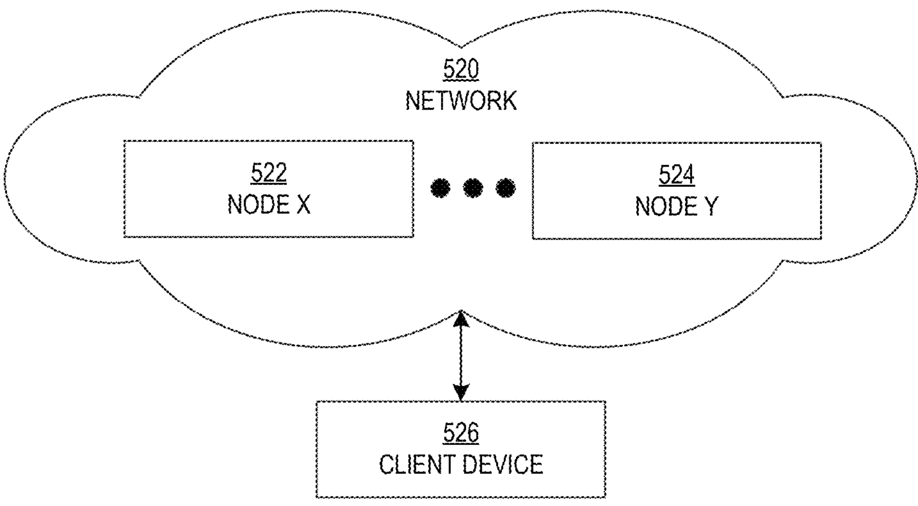

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

applying a document ranking layer of a document selection large language model (LLM) to a first document list corresponding to a training dataset to obtain a ranked document list, wherein the first document list comprises a first plurality of reference documents;

selecting a subset of the first plurality of reference documents from the ranked document list to obtain a first document subset of the first plurality of reference documents;

processing a first user prompt and the first document subset with a field LLM to generate a first answer, wherein the first user prompt corresponds to the training dataset;

ranking, by a ranking LLM, the first answer with an answer score;

ranking, by the ranking LLM, the first document subset to obtain a ranked document subset;

calculating a loss function of a preference optimization layer of the document selection LLM based on the answer score;

updating at least one training parameter of a foundation model of the document selection LLM based on the loss function of the preference optimization layer;

retrieving, for a second user prompt, a second document list comprising a second plurality of reference documents;

processing, with the document selection LLM after updating the at least one training parameter, the second document list to obtain a second document subset of the second plurality of reference documents, wherein the second document subset is ordered in decreasing relevance; and generating a second answer with the field LLM processing the second user prompt using the second document subset.

2. The method of claim 1, further comprising:

applying the document ranking layer of the document selection LLM to the first document list corresponding to the training dataset to obtain the ranked document list, wherein the document ranking layer ranks the first document list, the ranking comprising:

ranking a reference document of the first plurality of reference documents of the first document list based on an aggregate score of an aggregate score set of the training dataset, wherein the aggregate score corresponds to the reference document; and reordering the ranked document list based on the rank of the reference document.

3. The method of claim 1, further comprising:

ranking the first answer, wherein ranking further comprises:

receiving, by the ranking LLM as answer parameters, (i) the first answer, and (ii) a preferred answer corresponding to the training dataset, along with an answer ranking instruction to rank the first answer based on a similarity of the first answer to the preferred answer, processing, by the ranking LLM, the answer ranking instruction and the answer parameters to obtain the answer score, and assigning, by the ranking LLM, the answer score to the first answer.

4. The method of claim 1, further comprising:

ranking the first document subset, wherein ranking further comprises:

receiving, by the ranking LLM as document parameters, (i) the first document subset and (ii) a preferred answer corresponding to the training dataset, along with a document ranking instruction to rank each reference document of the first document subset of the first plurality of reference documents based on a relevance of the reference document to the preferred answer, processing, by the ranking LLM, the document ranking instruction and the document parameters to obtain a document ranking score, assigning, by the ranking LLM, the document ranking score to each reference document of the first document subset of the first plurality of reference documents of the first document subset, reordering the first document subset based on document ranking scores corresponding to each reference document of the first document subset of the first plurality of reference documents, to obtain the ranked document subset; and outputting, by the ranking LLM, the ranked document subset.

5. The method of claim 1, further comprising:

selecting a plurality of subsets from the ranked document list to obtain a plurality of document subsets;

processing the first user prompt corresponding to the training dataset, and each document subset of the plurality of document subsets, by the field LLM to generate a plurality of answers corresponding to the plurality of document subsets;

ranking, by the ranking LLM, the plurality of answers to obtain a plurality of ranked answers, wherein each answer of the plurality of answers is assigned a corresponding answer score; and ranking, by the ranking LLM, for each document subset of the plurality of document subsets, the first document subset of the first plurality of reference documents, wherein each reference document of the first document subset is assigned a document ranking score, to obtain a plurality of ranked document subsets.

6. The method of claim 1, further comprising:

retrieving, by a retrieval optimization engine, a past query structure from a data repository stored on a physical storage device, the past query structure comprising a past user prompt, and a past preferred answer;

retrieving, by a document retrieval application, from a document store in the data repository, a new document list comprising a plurality of new reference documents based on the past user prompt;

processing, by the field LLM, the past user prompt and the new document list to obtain a new answer based on the new document list;

ranking, by the ranking LLM, the new answer with a new answer ranking score; and ranking, by the ranking LLM, the plurality of new reference documents of the new document list with a corresponding plurality of new document ranking scores.

7. The method of claim 6, further comprising:

generating a new aggregate score set corresponding to the new document list, comprising:

generating a new aggregate score corresponding to a new reference document of the plurality of new reference documents of the new document list, wherein the new aggregate score is a new document ranking score of the corresponding plurality of new document ranking scores corresponding to the new reference document of the plurality of new reference documents of the new document list, aggregated with the new answer ranking score, and adding the new aggregate score to the new aggregate score set;

adding the past user prompt, the past preferred answer, the new document list, and the new aggregate score set to a new training dataset; and adding the new training dataset to training data stored in the data repository.

8. The method of claim 6, wherein ranking the new answer further comprises:

receiving, by the ranking LLM, as new answer parameters, (i) the past user prompt, (ii) the past preferred answer, and (iii) the new answer, along with a new answer ranking instruction to rank the new answer based on a similarity of the new answer to the past preferred answer;

processing, by the ranking LLM, the new answer parameters and the new answer ranking instruction to generate a new answer ranking score; and assigning, by the ranking LLM, the new answer ranking score to the new answer.

9. The method of claim 6, wherein ranking the plurality of new reference documents of the new document list further comprises:

receiving, by the ranking LLM as new document parameters, (i) the past preferred answer, and (ii) the new document list, along with a new document ranking instruction to rank each new reference document of the plurality of new reference documents of the new document list based on a relevance of the new reference document with respect to (i) the past user prompt and (ii) the past preferred answer;

processing, by the ranking LLM, the new document parameters and the new document ranking instruction to generate new document ranking scores corresponding respectively to each new reference document of the plurality of new reference documents of the new document list; and assigning, by the ranking LLM, the new document ranking scores respectively to each new reference document of the plurality of new reference documents of the new document list.

10. The method of claim 1, further comprising:

processing, by the field LLM, the second user prompt and the second document subset to obtain a second answer corresponding to the second user prompt; and transmitting the second answer as a response to a request comprising the second user prompt.

11. A method comprising:

applying a document ranking layer of a document selection large language model (LLM) to a document list corresponding to a training dataset to obtain a ranked document list, wherein the document list comprises a plurality of reference documents;

selecting a subset of the plurality of reference documents from the ranked document list to obtain a document subset of the plurality of reference documents;

processing a user prompt and the document subset with a field LLM to generate an answer, wherein the user prompt corresponds to the training dataset;

ranking, by a ranking LLM, the answer with an answer score;

ranking, by the ranking LLM, the document subset to obtain a ranked document subset;

calculating a loss function of a preference optimization layer of the document selection LLM based on the answer score;

updating at least one training parameter of a foundation model of the document selection LLM based on the loss function of the preference optimization layer;

selecting a plurality of subsets from the ranked document list to obtain a plurality of document subsets;

processing the user prompt corresponding to the training dataset, and each document subset of the plurality of document subsets, by the field LLM to generate a plurality of answers corresponding to the plurality of document subsets;

ranking, by the ranking LLM, the plurality of answers to obtain a plurality of ranked answers, wherein each answer of the plurality of answers is assigned a corresponding answer score;

ranking, by the ranking LLM, for each document subset of the plurality of document subsets, the document subset of the plurality of reference documents, wherein each reference document of the first document subset is assigned a document ranking score, to obtain a plurality of ranked document subsets;

calculating the loss function of the preference optimization layer of the document selection LLM based on answer scores corresponding to each answer of the plurality of answers; and updating the at least one training parameter of the foundation model of the document selection LLM, based on the loss function, wherein the at least one training parameter causes the foundation model to select the ranked document subset of the plurality of ranked document subsets corresponding to a ranked answer of the plurality of ranked answers with a highest answer score value as a preferred document subset.

12. A system comprising:

at least one computer processor;

a data repository, in communication with the at least one computer processor, and stored on a physical storage device;

a retrieval optimization engine, executing on the at least one computer processor;

a document selection LLM, comprising a foundation model, a document ranking layer, and a preference optimization layer, and executing on the at least one computer processor; and a ranking LLM, executing on the at least one compute processor, wherein the retrieval optimization engine is configured to:

retrieve training data from the data repository, the training data comprising a training dataset, cause the document selection LLM to apply the document ranking layer to a first document list corresponding to the training dataset to obtain a ranked document list, wherein the first document list comprises a first plurality of reference documents, select a subset of the first plurality of reference documents from the ranked document list to obtain a first document subset of the first plurality of reference documents, cause a field LLM to process a first user prompt and the first document subset to generate a first answer, wherein the first user prompt corresponds to the training dataset, cause the ranking LLM to rank the first answer with an answer score, cause the ranking LLM to rank the first document subset to obtain a ranked document subset, cause the document selection LLM to calculate a loss function of the preference optimization layer, based on the answer score, cause the document selection LLM to update at least one training parameter of the foundation model based on the loss function of the preference optimization layer, retrieve, for a second user prompt, a second document list comprising a second plurality of reference documents, cause the document selection LLM to process, after updating the at least one training parameter, the second document list to obtain a second document subset of the second plurality of reference documents, wherein the second document subset is ordered in decreasing relevance, and generate a second answer with the field LLM processing the second user prompt using the second document subset.

13. The system of claim 12, wherein:

the document selection LLM is further configured to:

apply the document ranking layer to the first document list corresponding to the training dataset to rank the first document list, the ranking comprising:

ranking a reference document of the first plurality of reference documents of the first document list based on an aggregate score of an aggregate score set of the training dataset, wherein the aggregate score corresponds to the reference document, and reordering the ranked document list based on the rank of the reference document.

14. The system of claim 12, wherein:

the ranking LLM is further configured to rank the first answer, the ranking further comprising:

receiving as answer parameters, (i) the first answer, and (ii) a preferred answer corresponding to the training dataset, along with an answer ranking instruction to rank the first answer based on a similarity of the first answer to the preferred answer, processing the answer ranking instruction and the answer parameters to obtain the answer score, and assigning the answer score to the first answer.

15. The system of claim 12, wherein:

the ranking LLM executing on the at least one computer processor is further configured to rank the first document subset, the ranking further comprising:

receiving as document parameters, (i) the first document subset and (ii) a preferred answer corresponding to the training dataset, along with a document ranking instruction to rank each reference document of the first document subset of the first plurality of reference documents based on a relevance of the reference document to the preferred answer, processing the document ranking instruction and the document parameters to obtain a document ranking score, assigning the document ranking score to each reference document of the first document subset of the first plurality of reference documents of the first document subset, reordering the first document subset based on document ranking scores corresponding to each reference document of the first document subset of the first plurality of reference documents, to obtain the ranked document subset; and outputting the ranked document subset.

16. The system of claim 12, wherein:

the document selection LLM is further configured to select a plurality of subsets from the ranked document list to obtain a plurality of document subsets; and the retrieval optimization engine executing on the at least one computer processor is further configured to:

cause the field LLM executing on the at least one computer processor to process the first user prompt corresponding to the training dataset, and each document subset of the plurality of document subsets to generate a plurality of answers corresponding to the plurality of document subsets, cause the ranking LLM executing on the at least one computer processor to rank the plurality of answers, to obtain a plurality of ranked answers, wherein each answer of the plurality of ranked answers is assigned a corresponding answer score, and cause the ranking LLM executing on the at least one computer processor to rank, for each document subset of the plurality of document subsets, the first document subset of the first plurality of reference documents, wherein each reference document of the first document subset is assigned a document ranking score, to obtain a plurality of ranked document subsets.

17. The system of claim 16, wherein:

the document selection LLM is further configured to:

calculate the loss function of the preference optimization layer of the document selection LLM based on answer scores corresponding to each answer of the plurality of answers, and update the at least one training parameter of the foundation model of the document selection LLM, based on the loss function, wherein the at least one training parameter causes the foundation model to select the ranked document subset of the plurality of ranked document subsets corresponding to a ranked answer of the plurality of ranked answers with a highest answer score value as a preferred document subset.

18. The system of claim 12, further comprising:

a document retrieval application, executing on the at least one computer processor;

and wherein:

the retrieval optimization engine executing on the at least one computer processor is further configured to retrieve a past query structure from the data repository, the past query structure comprising a past user prompt, and a past preferred answer, the document retrieval application executing on the at least one computer processor is further configured to retrieve a new document list from a document store in the data repository, the new document list comprising a plurality of new reference documents based on the past user prompt, the field LLM executing on the at least one computer processor is further configured to process the past user prompt and the new document list to obtain a new answer based on the new document list, and the ranking LLM executing on the at least one computer processor is further configured to:

rank the new answer with a new answer ranking score, and rank the plurality of new reference documents of the new document list with a corresponding plurality of new document ranking scores.

19. The system of claim 18, wherein:

the retrieval optimization engine is further configured to:

generate a new aggregate score set corresponding to the new document list, wherein generating comprises:

generating a new aggregate score corresponding to a new reference document of the plurality of new reference documents of the new document list, wherein the new aggregate score is a new document ranking score of the plurality of new document ranking scores corresponding to the new reference document of the plurality of new reference documents of the new document list, aggregated with the new answer ranking score, and adding the new aggregate score to the new aggregate score set;

add the past user prompt, the past preferred answer, the new document list, and the new aggregate score set to a new training dataset; and add the new training dataset to the training data.

20. The system of claim 18, wherein:

the ranking LLM executing on the at least one computer processor is further configured to:

receive, as new answer parameters, (i) the past user prompt, (ii) the past preferred answer, and (iii) the new answer, along with a new answer ranking instruction to rank the new answer based on a similarity of the new answer to the past preferred answer, process the new answer parameters and the new answer ranking instruction to generate a new answer ranking score, assign the new answer ranking score to the new answer, receive, as new document parameters, (i) the past preferred answer, and (ii) the new document list, along with a new document ranking instruction to rank each new reference document of the plurality of new reference documents of the new document list based on a relevance score of the new reference document with respect to the past preferred answer, process the new document parameters and the new document ranking instruction to generate new document ranking scores corresponding respectively to each new reference document of the plurality of new reference documents of the new document list; and assign the new document ranking scores respectively to each new reference document of the plurality of new reference documents of the new document list.

* * * * *